Apr. 24, 1923.

J. H. STORTZ 1,452,713

COUNTING AND REGISTERING DEVICE FOR BOX WRAPPING AND SIMILAR MACHINES

Filed Nov. 19, 1920    5 Sheets-Sheet 1

WITNESS:

INVENTOR
John H. Stortz
BY Frank S. Busser
ATTORNEY.

Apr. 24, 1923.
J. H. STORTZ
1,452,713
COUNTING AND REGISTERING DEVICE FOR BOX WRAPPING AND SIMILAR MACHINES
Filed Nov. 19, 1920
5 Sheets-Sheet 2
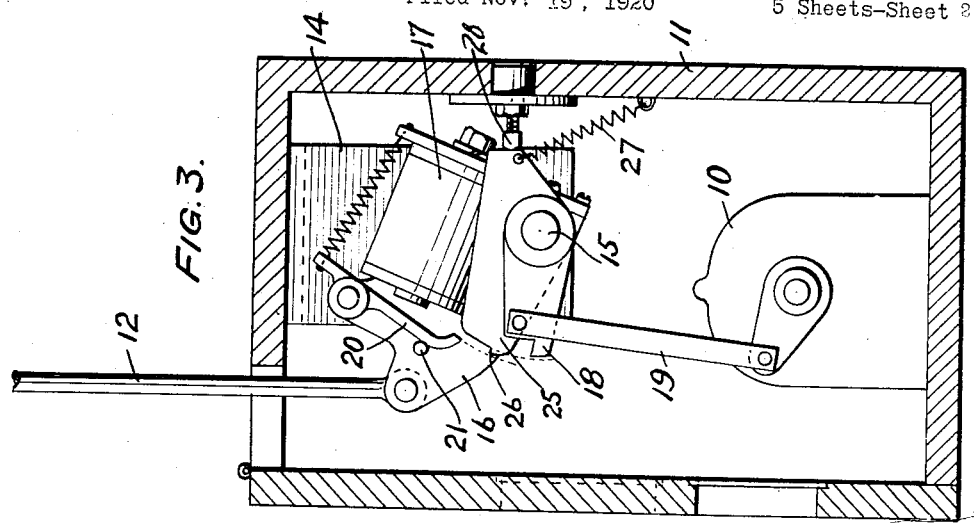
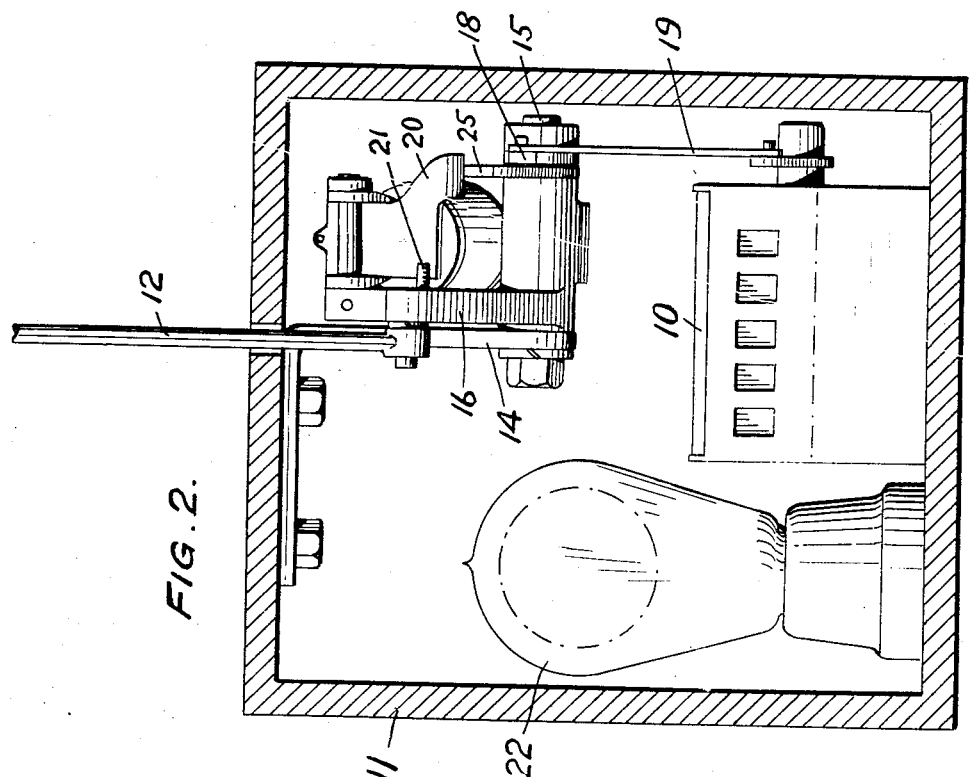
WITNESS:
INVENTOR
John H. Stortz
ATTORNEY.

Apr. 24, 1923.                                                                    1,452,713
J. H. STORTZ
COUNTING AND REGISTERING DEVICE FOR BOX WRAPPING AND SIMILAR MACHINES
Filed Nov. 19, 1920.                     5 Sheets-Sheet 3
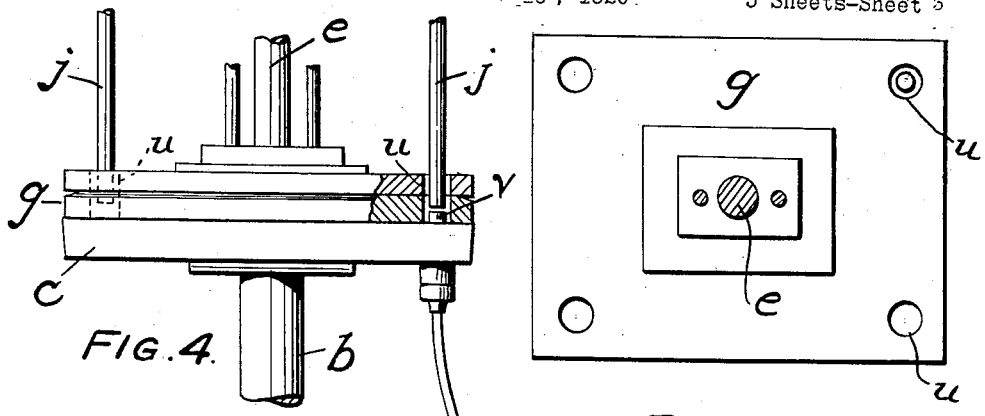
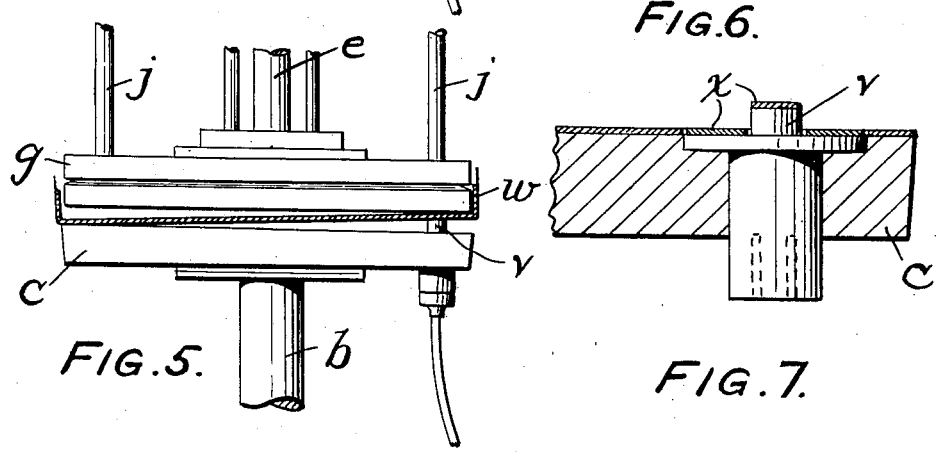
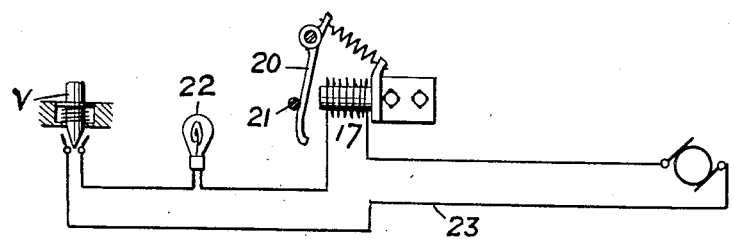
FIG.8.
WITNESS:
Rob. P. Kitchel
INVENTOR
John H. Stortz
BY Frank S. Busser
ATTORNEY.

Apr. 24, 1923.

J. H. STORTZ 1,452,713

COUNTING AND REGISTERING DEVICE FOR BOX WRAPPING AND SIMILAR MACHINES

Filed Nov. 19, 1920     5 Sheets-Sheet 4

WITNESS:

INVENTOR
John H. Stortz
BY Frank S. Busser
ATTORNEY.

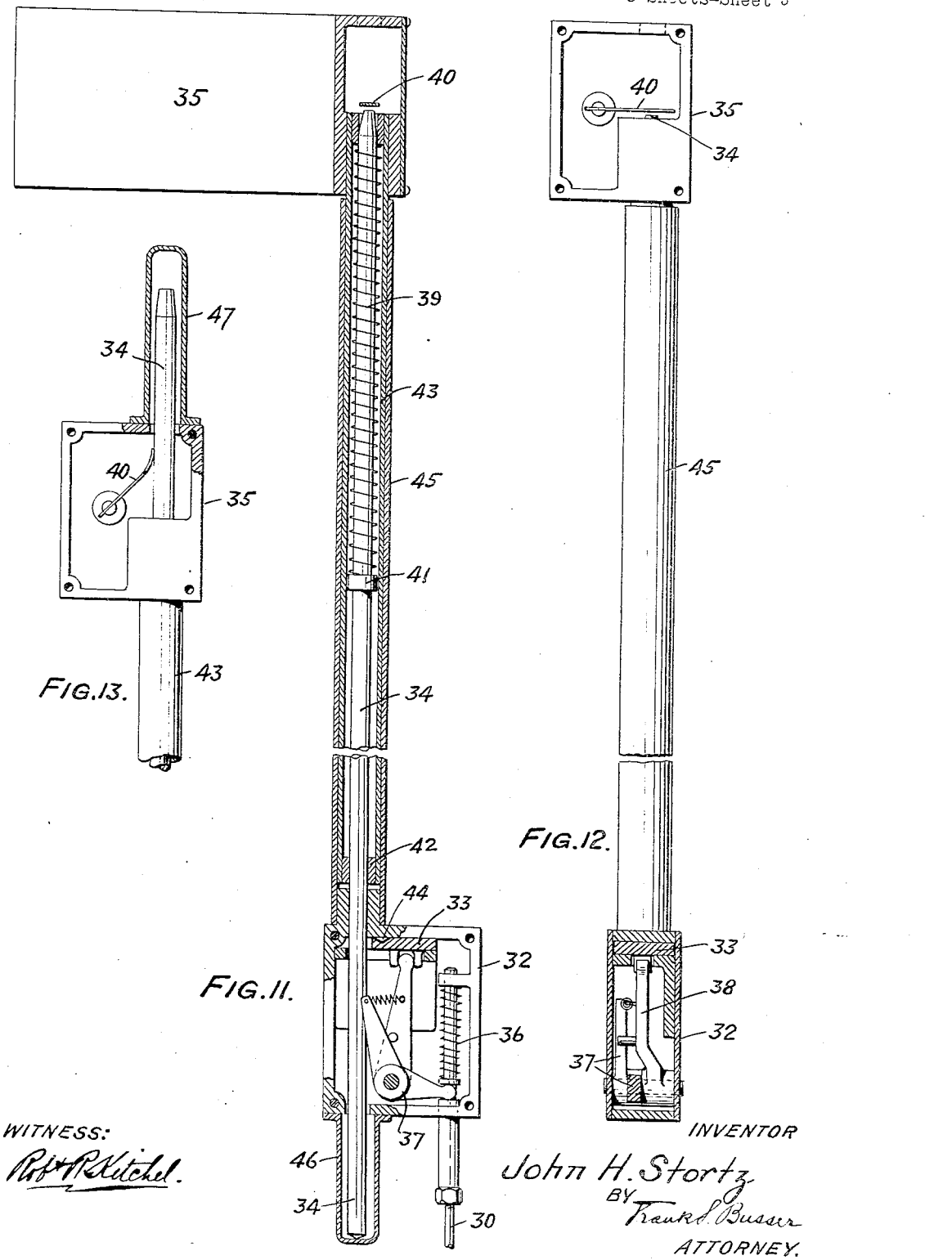

Patented Apr. 24, 1923.

1,452,713

UNITED STATES PATENT OFFICE.

JOHN H. STORTZ, OF PHILADELPHIA, PENNSYLVANIA.

COUNTING AND REGISTERING DEVICE FOR BOX WRAPPING AND SIMILAR MACHINES.

Application filed November 19, 1920. Serial No. 425,056.

*To all whom it may concern:*

Be it known that I, JOHN H. STORTZ, a citizen of the United States, residing at Philadelphia, county of Philadelphia, and State of Pennsylvania, have invented a new and useful Improvement in Counting and Registering Devices for Box Wrapping and Similar Machines, of which the following is a full, clear, and exact description, reference being had to the accompanying drawings, which form a part of this specification.

My invention relates to counting or registering devices of the selective type. Many machines which are continuously operated and are fed intermittently occasionally make blank passes, that is, they fail to receive a blank at certain times and go through their motions at such times without any object to act upon. Thus a register attached to such a machine, for registering the number of times it acts, does not produce a registration of the work actually turned out. Some selective function must be incorporated in the register, which will differentiate between what may be called the working and the blank passes of the machine, and this is exactly what my device accomplishes; it registers the number of pieces turned out, whether the machine is properly fed every cycle or not.

I have shown my device in connection with a box wrapping machine, which is a continuously reciprocating machine, adapted to be fed with a box form at every cycle, but operating just the same whether the forms are inserted or not. Such a machine is for the purpose of wrapping the bare cardboard box form with an outer covering of glazed or otherwise finished paper. The operator of such a machine is frequently paid by the piece and it is important for this and other reasons to have a register which indicates the exact number of finished boxes turned out.

My device may be readily attached to existing machines of this character, with little or no change, and it does not in any way mark the product or interfere with the proper operation of the machine to full capacity.

My device utilizes the box form itself as a factor in its operation and therefore registers only the reciprocations of the machine which turn out work, being unaffected by its idle operation.

I will now proceed with a detailed description of my device in connection with such a machine, but it will be understood that it is applicable to other machines of a similar character. In the accompanying drawings, to which the specification refers—

Figs. 2 and 3 are, respectively, a front and side detail view of my register operating device.

Fig. 4 is a detail view of the presser plates of the machine showing the non-operation of the register mechanism when a box form is not present.

Fig. 5 is a similar view with a box form in place and about to operate the register.

Fig. 6 is a plan view of the pressure plates.

Fig. 7 is an enlarged sectional view of a portion of the lower presser plate.

Fig. 8 is a wiring diagram.

Fig. 11 is a detail sectional view of apparatus of the modified form.

Fig. 12 is a similar view taken at right angles to the showing of Fig. 11.

Fig. 13 is a partial view similar to Fig. 12, with parts in a different position.

Referring more particularly to Figures 1 to 8 inclusive, the machine comprises a frame *a* carrying in its lower portion a plunger *b* supporting the lower presser plate *c*. The frame is provided above with vertical guide-ways *d* in which slides the upper plunger *e* in vertical alignment with lower plunger *b*. The upper plunger carries the upper presser plate *g*.

Figure 1:
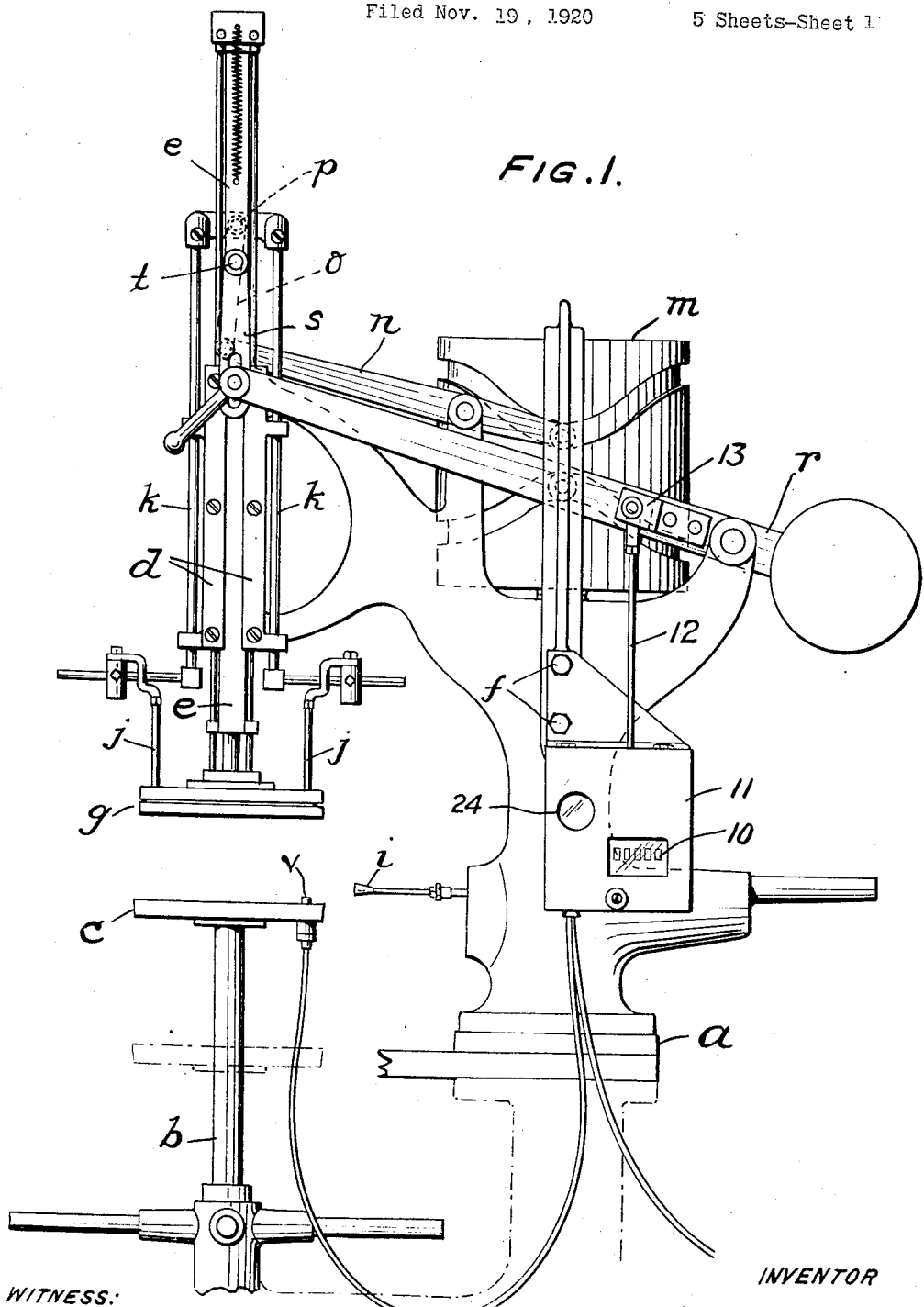
Fig. 1 is an elevation showing so much of a box wrapping machine as is necessary, with my invention applied thereto.
Figure 9:
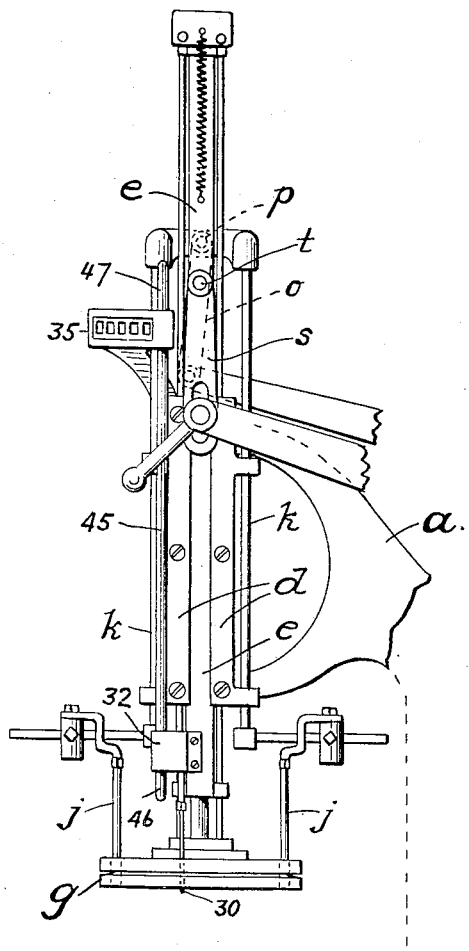
Fig. 9 is a partial view of a machine, similar to Fig. 1, with a modified form of my invention applied thereto.

In the operation of the machine, the operator places a box form and wrapper on the lower plate *c*, the upper plate *g* descends upon it so that the box is clamped between the two plates, which then continue downward to about the position shown in dotted lines Fig. 1. During this movement, certain brushes and wipers, not shown, act to fold the wrapper about the box as desired, after which the presser plates ascend to the mid position, where the lower plate halts in the position from which it started. The upper presser plate continues to rise, out of the box, which is later ejected from the machine by a small plunger $i$ which is projected forward at the proper time for that purpose.

When the upper presser plate is raised out of the box, strippers are provided for preventing the box from being raised thereby and holding it down on plate $c$. The strippers comprise in this case four rods $j$ carried on a frame $k$, slidable vertically through ears on either side of guide-way $d$.

These members are operated in the following way. The machine carries a vertical cam drum $m$, which is kept continuously revolving while the machine is in operation, by shafts and pulleys which are not shown as they do not affect the present invention.

Drum $m$ is provided with a cam-way actuating a lever $n$, which in turn, through a link $o$ pivoted to frame $k$ at $p$, in the rear of the machine operates said frame vertically to raise and lower the strippers $j$ at the proper times to effect their object as required.

Drum $m$ is provided with another cam-way actuating a counterweighted lever $r$, which through a link $s$ pivoted to plunger $e$ at $t$, operates said plunger vertically to raise and lower the upper presser plate $g$ as required in the operation of the machine.

As shown in Figs. 4 and 6, the upper presser plate is provided with holes $u$ to admit of the free passage of the strippers $j$ therethrough. In vertical alignment with one of these holes $u$ I have mounted in the lower presser plate an ordinary push button electric switch $v$. In the idle operation of the machine, this switch remains inactive, so when the upper plate descends upon it, the button projects into the open hole $u$, and the strippers $j$ do not extend down far enough to touch it, as shown in Fig. 4.

When, however, a box form $w$ is placed upon the lower plate, one corner of it rests upon the push button, see Fig. 5, and when the upper plate descends, the box is pressed down flat upon the lower plate, pressing down the button and closing the switch. Upon the subsequent raising of the upper plate, the usual spring in the push button raises it into operative position again.

In order not to mar the finish of the box, I make said spring, not shown, a light one, and I cover the end of the button and top of the switch with felt $x$ to correspond with the felt covering over the rest of the plate.

I provide a numerical registering or counting device 10 of standard construction, mounted in a locked box 11, carried by a bracket which is fastened to frame $a$ by bolts $f$, in a convenient position to be seen and read by the operator.

The register is adapted to be operated by a rod 12, depending from a bracket 13 attached to the lever $r$ which operates the upper presser plate.

Within box 11, a bracket 14 carries a stud 15 upon which is pivoted a small frame 16 carrying an electro-magnet 17. The lower end of rod 12 connects with frame 16 so that at every reciprocation of the machine frame 16 is rocked upon its pivot 15.

A trip arm 18 is also mounted upon stud 15 and connected by link 19 with the operating lever of the register. A trip finger 20 is pivotally mounted on frame 16, in position to be acted upon by the electro-magnet, but normally spring-held outward against a stop 21 on the frame.

The parts are so arranged that, in the position described, and shown in Fig. 3, when the machine is operated and rod 12 is brought down by lever $r$, frame 16 is rocked about its pivot 15, but trip arm 18 remains stationary, because finger 20 is carried past on an arc which clears it. When, however, the magnet is energized to draw the finger 20 inward, in the rocking of frame 16 the finger catches the end of trip arm 18 and actuates the register.

I have placed a small electric lamp 22 in series in the circuit with the magnet, which circuit also includes push button $v$, as shown diagrammatically in Figure 8.

Thus at every operation of the machine when a box intervenes between the presser plates, a circuit is made in line 23, lamp 22 is lighted and shines through a hole 24 in the front of box 11 to inform the operator, and finger 20 is drawn by the magnet into position to act upon trip arm 18 and operates the register.

It will readily be seen that if the push button were to become jammed so that the circuit remains closed the finger 20 will be held in, and the register will work continuously regardless of whether boxes are entered or not. To provide against this contingency, I pivot a guard arm 25 on stud 15, right next to trip arm 18, and having a catch 26 on its outer end. Arm 25 presents its outer end in the path of finger 20, when the latter descends with its magnet energized, and it is held in such angular position by a spring 27, against a stop 28, that the descending finger will strike it before it reaches trip arm 18. The end of the guard drum is so shaped that finger 20, when it strikes it, is moved outwardly to catch 26, and finishes its rocking stroke in a path which clears trip arm 18 and therefore does not operate the counter.

In the normal operation of the device the electric circuit is closed when the upper presser plate has completed nearly half its downward stroke. This causes the magnet 17 to be energized to draw finger 20 into operative position in time to catch the end of trip arm 18, but not till after it has passed the guard arm 25. Therefore, normally the guard arm remains inactive, finger 20 riding past it and then being drawn in to catch the trip arm and work the counter. On the return motion, the trip arm is raised to its former position by a spring, not shown, in the register 10.

It will be noticed that the push button is not actuated until the upper presser plate has completed about half its downward stroke and meets the lower plate. At this moment the end of finger 20 is angularly between the guard arm and the trip arm. I have intentionally made this angle small and made it occur at such a point in the stroke that the circuit cannot be closed by any other means than that shown, in order to safeguard the device against tampering by the operator. The circuit must be closed during the time the finger 20 is passing the angle between the guard arm 25 and the trip arm 18, or no recording can take place in the register.

The lamp 22 flashing up at every loaded stroke of the machine is a great help, as it lights up with such regularity that it is very noticeable when it misses. A foreman in a room with a number of these machines can readily notice the failures thereby.

Referring now to Figures 9 to 13 inclusive, in which I have shown means for operating the register mechanically, without the aid of any electric connection, a light rod 30 extends down freely through the upper presser plate and projects about a quarter inch below same. A hole 31 is provided in the lower plate to allow the free entry of this projection when the plates come together and no box intervenes, just as push button $v$ projected freely into hole $u$ in the electric device.

Rod 30 projects downwardly from a small box 32 carried on plunger $e$. Within this box a latch plate 33 is arranged to be moved into the path of a rod 34 which is lowered and raised in every operation of the machine to actuate a counter 35 fixedly carried by a bracket attached to the machine frame. Rod 30 is held down by a spring 36, and is in connection with a bell crank 37, which in turn is spring connected to an arm 38 which actuates latch 33.

Rod 34 is pressed downward by a spring 39 so that its upper end is just below and in readiness to actuate the arm 40 of the counter 35.

Figure 10:
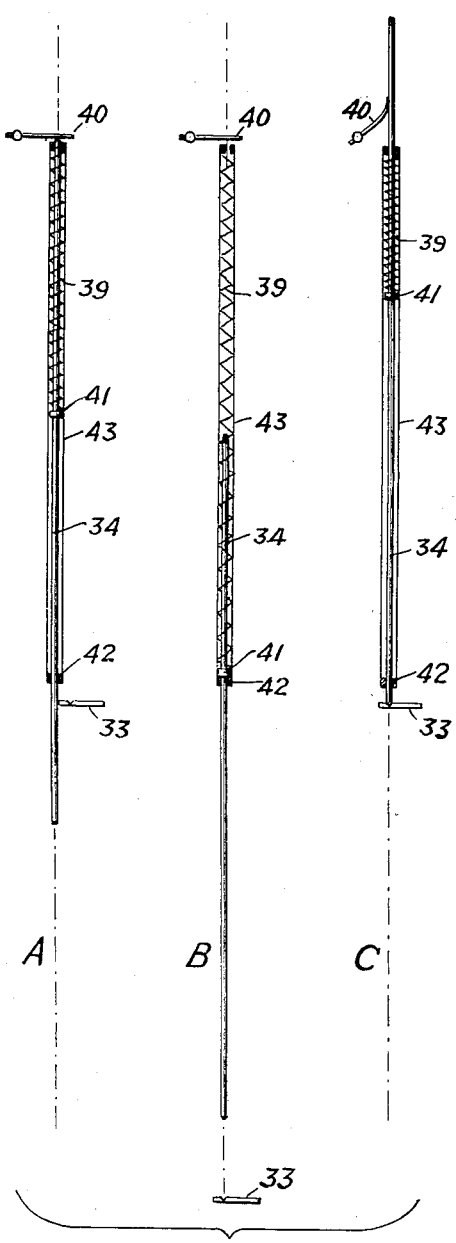
Fig. 10 shows diagrammatically three positions in the working of the modification.

Beginning at the upper end of a stroke, with the parts in position as described and shown diagrammatically at A, Fig. 10, plunger $e$ descends carrying with it box 32 and rod 30. About half way down, the presser plate meets lower plate $c$ and if a box form is present between them, rod 30 is raised slightly, tripping bell crank 37, which through arm 38 draws latch 33 to the left, Fig. 11. At this moment the latch presses against rod 34 and cannot make its full throw.

As the plunger descends, however, a collar 41 on rod 34 comes to rest upon a stop 42 in the lower end of a tube 43 fixedly carried by the counter and surrounding the rod. Further descent of the plunger, box 32 and latch 33, to its lowest position indicated at B, Fig. 10, withdraws rod 34 from box 32 and the latch is allowed to complete its throw, and come underneath the rod.

Now the plunger rises and very shortly latch 33 picks up rod 34 and carries it up with it the remainder of the up stroke. Half way up, the lower plate $c$ again comes to rest with the covered box on it, and the presser plate is withdrawn from it, relieving the pressure on the small rod 30. Latch 33 does not retract, however, as it is provided with a countersink 44 which catches on the pointed lower end of rod 34 sufficiently to hold the parts in place.

As the plunger completes its upward stroke, rod 34 compresses spring 39 and the upper end of it strikes and operates arm 40 of the counter, and is allowed to pass by it as the arm is made flexible for this purpose as shown in Fig. 13. The parts now stand in position as indicated at C, Fig. 10, and succeeding strokes of the plunger maintain rod 34 on top of latch 33, and operate the register as described, so long as a box form is present on plate $c$.

If, during any operation of the machine, a box form is not present, in the descent of the plunger, near the bottom of its stroke, latch 33 will lower away from rod 34, and the instant it does so, it will snap back to the right due to the fact that small rod 30 has passed freely into opening 31. Therefore, in the succeeding upward stroke, as box 32 rises, it allows rod 34 to pass freely through it until it comes to rest on the bottom, and rod 34 will not be raised sufficiently to operate the register, as shown in Fig. 11.

A tube 45 is attached to box 32, to surround tube 43 and slide telescopically thereon, for the purpose of at all times keeping rod 34 enclosed to prevent tampering therewith. For similar reasons, the lower and upper ends of the throw are enclosed by tubes 46, 47.

Having now fully described my invention, what I claim and desire to protect by Letters Patent is:—

1. In a box wrapping or similar machine, the combination with a counter, of a reciprocating member of the machine, a box support adapted to be moved by said member, normally inoperative connections from said member to operate the counter, and means, controlled by a box between said member and the support during the reciprocation of the support, to render said counter operating connections operative.

2. In a box wrapping or similar machine, the combination with a counter, of a reciprocating box carrier, a reciprocating plunger for moving the box and the carrier, a latch adapted to operate the counter at each reciprocation, means to normally hold said latch inoperative when the plunger is in its retracted position, and means, controlled by a box when present on the carrier, to render the latch operative when the carrier is moved.

3. In a box wrapping or similar machine having two reciprocating elements between which the box is held during the wrapping, the one element being arranged to be carried with the other element during a portion of its movement, means for continuously reciprocating the second element, the combination with a counter, of operating means carried by the one element for actuating the counter, and means carried by the other element for connecting the operating means to the counter when the elements are moved together with an interposed box.

4. In a machine for turning out work to be counted, the combination with a counter, of a normally inactive latch for operating same, plates for receiving the work between them and carrying it through the machine, a projection on one of the plates which when depressed renders the latch operative and a hole in the other plate for freely admitting the projection, whereby said projection is only actuated by the interposition of work between the plates.

5. In a box wrapping of similar machine, the combination with a counter, of a reciprocating box carrier, a normally inoperative latch adapted to operate the counter at each reciprocation, a reciprocating press coacting with the carrier, a projection on said press, means to cause the press to depress said projection only when a box form is present on the carrier, and means whereby the depressing of the projection causes said latch to become operative during the further movement of the carrier.

6. In a box wrapping or similar machine, the combination with a counter, of a reciprocating box carrier, a normally inoperative latch adapted to operate the counter at each reciprocation, a reciprocating press coacting with the carrier, a projection on said press, connections from the projection to operate the latch, and means whereby the press, midway of its stroke, operates said projection.

7. In a machine for turning out work to be counted, the combination with a counter, of a normally inactive latch for operating same, a projection for causing said latch to become active by the work on its way through the machine, and a trip for throwing said latch out of action if in action before the work reaches a predetermined position.

8. In a machine for turning out work to be counted, the combination with a counter, of a normally inactive latch for operating same, a projection the pressing of which causes said latch to become active, means to cause the projection to be pressed by each piece of work as it passes through the machine, and a trip for throwing said latch out of action if in action before the work reaches a predetermined position.

9. The combination of a box wrapping or similar machine and a register, said machine having a reciprocating member to manipulate the box during the wrapping and arranged to be continuously reciprocated when the machine is in operation, a box support arranged to be moved by said member, register actuating means associated with said member and arranged to be actuated each reciprocation, a clutch device for connecting the actuating means and register, and means for actuating the clutch to connect the register actuating means and the register arranged to be actuated by a box when positioned between the said member and the support during the manipulation of the box by the reciprocating member.

In testimony of which invention I have hereunto set my hand at Philadelphia, Pa. on this 16th day of November, 1920.

JOHN H. STORTZ.